(12) United States Patent
Marquardt

(10) Patent No.: US 7,482,536 B2
(45) Date of Patent: Jan. 27, 2009

(54) UNDERFLOOR CABLE JUNCTION UNIT AND COMPUTER CENTER EQUIPPED WITH SUCH JUNCTION UNITS

(75) Inventor: Traugott Marquardt, Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 135 days.

(21) Appl. No.: 10/629,703

(22) Filed: Jul. 30, 2003

(65) Prior Publication Data

US 2004/0020232 A1   Feb. 5, 2004

(30) Foreign Application Priority Data

Jul. 31, 2002   (GB) ................. 0217784.8

(51) Int. Cl.
*H02G 3/08* (2006.01)

(52) U.S. Cl. .............. 174/60; 174/486; 174/490; 174/482; 174/68.1; 52/220.8; 52/263; 52/220.5; 248/49

(58) Field of Classification Search ............ 52/220.3, 52/220.2, 220.8, 239, 126.5, 126.3, 126.2, 52/263, 220.5, 506.06, 126.6; 248/49, 65, 248/68.1, 74.1, 72–73; 211/26.2, 126.8, 211/126.9; 174/48, 49, 480, 481, 482, 486, 174/490, 60, 68.1
See application file for complete search history.

(56) References Cited

U.S. PATENT DOCUMENTS

| | | | | |
|---|---|---|---|---|
| 875,279 A | * | 12/1907 | McCoy | 174/60 |
| 4,536,612 A | * | 8/1985 | Domigan | 174/48 |
| 5,149,277 A | | 9/1992 | LeMaster | |
| 5,316,244 A | * | 5/1994 | Zetena, Jr. | 248/49 |
| 5,340,326 A | | 8/1994 | LeMaster | |
| 5,467,609 A | * | 11/1995 | Feeney | 62/259.2 |
| 5,548,932 A | * | 8/1996 | Mead | 248/49 |
| 5,672,845 A | | 9/1997 | Greenfield et al. | |
| 5,673,522 A | | 10/1997 | Schilham | |
| 5,828,001 A | | 10/1998 | Schilham | |
| 5,834,693 A | * | 11/1998 | Waddell et al. | 174/65 R |
| 5,918,837 A | * | 7/1999 | Vicain | 248/49 |
| 6,129,316 A | * | 10/2000 | Bauer | 248/68.1 |
| 6,170,784 B1 | * | 1/2001 | MacDonald et al. | 248/68.1 |
| 6,370,831 B1 | | 4/2002 | Marshall et al. | |
| 6,438,309 B1 | * | 8/2002 | Franz | 385/135 |
| 6,541,705 B1 | * | 4/2003 | McGrath | 174/99 R |
| 2002/0003194 A1 | | 1/2002 | Simmons | |
| 2004/0035983 A1 | * | 2/2004 | Simonson et al. | 248/49 |

FOREIGN PATENT DOCUMENTS

| | | |
|---|---|---|
| EP | 0 578 306 | 1/1994 |
| JP | 7-87651 A | 3/1995 |
| JP | 10-28313 A | 1/1998 |
| JP | 2002-61911 A | 2/2002 |
| WO | WO 98/32204 | 7/1998 |

* cited by examiner

*Primary Examiner*—Richard E Chilcot, Jr.
*Assistant Examiner*—Chi Q Nguyen

(57) ABSTRACT

An underfloor cable junction unit for installation in a raised-floor system used as cooling air supply duct for devices arranged on the raised floor and having floor panels with cooling air outlets has a top side. The top side or at least a major part of it is open to enable the passage of cooling air through the top side toward a floor panel with cooling air outlets.

39 Claims, 5 Drawing Sheets

US 7,482,536 B2

UNDERFLOOR CABLE JUNCTION UNIT AND COMPUTER CENTER EQUIPPED WITH SUCH JUNCTION UNITS

RELATED APPLICATIONS

The present application is based on, and claims priority from, United Kingdom Application Number 02177845, filed Jul. 31, 2002, the disclosure of which is hereby incorporated by reference herein in its entirety.

FIELD OF THE INVENTION

The present invention relates generally to the provision of data cable connections for computers in a computer center, and, for example, to an underfloor cable junction unit as well as a computer center equipped with such junction units.

BACKGROUND OF THE INVENTION

A raised-floor system is used where it is desirable to maintain ready access below the floor surface to cables, wiring, etc. Such access floor systems are used extensively in computer and control rooms. They have a discrete modular structure, made up of module floor panels which are supported above a base floor by a plurality of upright support columns. Raised-floor systems for computer rooms are, for example, disclosed in U.S. Pat. Nos. 5,467,609 A and 6,370,831 B1.

Normally, computers produce a considerable amount of heat, so that computer rooms have to be air-conditioned. The volume between the base floor and the raised floor of a raised-floor system can be used as a cooling air supply duct. Typically, the cooling air enters this volume at one side of the computer room and leaves the volume upwardly through floor panels with cooling air outlets distributed over the computer room (see, for example, JP 2002061911 A).

Usually, computers have to be connected to active network elements, such as routers and switches, with data transmission cables, in the form of copper cables or optical fiber cables. These data cables run below the raised floor so as to keep the surface of the raised floor free of obstacles in order to provide the operators free access to the computer equipment. An example of a raised-floor system with underfloor cable trays is disclosed in US 2002/0003194 A1.

Cabling a computer room uniquely for a particular computer configuration would be very inflexible. For example, if in a certain part of the computer room existing computers are replaced by computers requiring a different type of data cable or having a higher port density, existing data cables would have to be replaced (which is hardly possible) or additional data cables would have to be laid. Therefore, to enable a computer room to be used in a flexible way, computer rooms are usually equipped from the outset with a universal data cabling. For example, such a universal cabling includes as many copper cables and optical monomode and multimode fiber cables as required for all expected future computer configurations. The cables end at cable junction units which are distributed throughout the computer room. These data cables and their respective junction units are permanently installed and are not changed, even when the computer configuration is changed. The ports of each computer are connected to one or more nearby junction units by means of (normally flexible) patch cables. Only the patch cable cabling is changed when the computer configuration changes.

In raised-floor systems, data cable junction units are usually disposed below the surface of the raised floor. Underfloor junction boxes for use in general office areas are, for example, described in U.S. Pat. Nos. 5,673,522 A, 5,149,277, 5,340,326 and JP 10028313 A. WO 98/322204 and JP 07087651 A disclose junction units with two rows of connectors.

A prior art underfloor cable junction unit used in computer room installations is shown in FIG. 8 which is a perspective view of a part of a computer room with a raised-floor system in which the floor panels are shown to be transparent. On a base floor 1, floor columns 2 support floor panels 3 which together form a raised floor 4. The raised-floor system is a modular system in which the floor panels 3 are typically in the form of squares, for example with the dimension of 60 cm×60 cm which rest on a square frame which in turn rests on the floor columns 2 arranged at the square corners. The height of the raised floor is typically 50 cm to 70 cm, but there are also installations of only about 30 cm. Computers 5 (only two of them are shown in FIG. 8) are placed on the raised floor 4.

Whereas the basic type of floor panel 3 has a completely closed surface, there are special floor panels with cooling air outlets 6 and floor panels with a cable aperture 7. Cooling air 8 flows in the volume under the raised floor 4 in a certain direction (from right to left in FIG. 8), and at each floor panel 3a some of the cooling air is branched off upwardly, flows through the cooling air outlets 6 and is partly sucked in by the nearby computers 5.

The room under the raised floor 4 also accommodates the cabling of the computer room. For example, in FIG. 8 bunches 9 of data cables run from a data communication room (not shown in FIG. 8) on the left-hand side of FIG. 8 on the base floor 1 from the left to the right in FIG. 8 (only one cable bunch 9 is shown in FIG. 8). The cable bunches comprise individual data cables 10 or bundles 12 of data cables which run in trough-like cable trays (not shown in FIG. 8) which define a cable route and thereby form the cable bunches 9. A plurality of underfloor cable junction units 11 are arranged throughout the computer room under the raised floor 4, one of which is illustrated in FIG. 8. The cable junction unit 11 is a closed box mounted on a support 13 closely below a floor panel 3 of the raised floor 4. The support 13 is C-shaped, wherein the lower leg 14 of the "C" is fixed to the base floor 1 and the junction unit 11 is mounted on the upper leg 15 of the "C". The cable bunch 9 runs over the lower leg 14. The junction unit 11 has a cable bundle inlet 16 at one of its faces and a row 17 of connectors or ports 18 at either lateral side. In the example of FIG. 8, the junction unit 11 has two rows 17 of eight connectors 18, i.e. sixteen connectors or ports 18 in total. One of the cable bundles 12 branches off from the cable bunch 9 and runs upwardly to the cable bundle inlet 16. Inside the box-shaped junction unit 11, the cable bundle 12 is separated into individual cables 10 which are here connected to the cable connectors 18. If the cables 10 are copper cables, the cable connectors 18 are typically RJ45, RJ11, 25-pin sub-D, V35, X21, or RS232 connectors. If the cable bundle 9 is an optical bundle cable, the junction unit serves as a splice box, in which, upon installation, the optical bundle cable is separated into individual optical fibers, the ends of which are then manually spliced with the (optical) connectors 18 within the junction unit 11. The optical cable connectors are typically SC, ST, E2000, MTRJ or LC connectors.

The cabling described so far, is permanent, i.e. it is not changed when the configuration of computers 5 to be connected is changed. Rather, the part of the cabling which is adaptable to a particular computer configuration is constituted by patch cables 19 with suitable cable connectors 20 at both ends. The (typically flexible) patch cables 19 connect the connectors 18 with computer ports 21. They run from the junction units 11 below the raised floor 4, pass through the cable aperture 7 next to the computer 5 to be connected, and then run on the raised floor 4 to the computer 5.

Although junction units of the type described in FIG. 8 were considered sufficient in the past, there remains a need to provide an improved underfloor cable junction unit and computer centers equipped with such improved junction units.

SUMMARY OF THE INVENTION

A first aspect of the invention is directed to an underfloor cable junction unit for installation in a raised-floor system used as cooling air supply duct for devices arranged on the raised floor and having floor panels with cooling air outlets. According to the first aspect, the junction unit has a top side, which, or at least a major part of which, is open to enable the passage of cooling air through the top side toward a floor panel with cooling air outlets.

According to another aspect, an underfloor cable junction unit for installation in a raised-floor system used as cooling air supply duct is provided. The junction unit has opposite faces and comprises rows of connectors arranged on at least two levels one above the other at at least one of the faces. Open slits are provided in at least one of the faces between the rows of connectors to facilitate the passage of cooling air through the junction unit from face to face.

According to another aspect, an underfloor cable for installation in a raised-floor system. The junction unit has opposite faces and comprises slide-in connector units able to be slid into the junction unit at at least one of its faces from outside. The slide-in connector units are arranged on at least two levels in the junction unit, one above the other.

According to another aspect, an underfloor cable junction unit with rows of connectors for installation in a raised-floor system is provided. The junction unit has a frame structure with a frame. The frame comprises portal-like front parts and sidebars connecting the front parts, such that the portal like front parts are arranged opposite each other.

According to another aspect, an underfloor cable junction unit for installation in a raised-floor system is provided. The junction unit has faces and lateral sides. At least one of the faces is equipped with rows of connectors. At least one horizontal sidebar is arranged at each of the lateral sides, wherein the sidebar is arranged to enable permanent cables coming from the inner side of connector rows to pass above and outwardly of the sidebar downwardly to a base floor and to be fixed to the sidebar.

According to another aspect, a computer center having a raised floor on which computers are arranged is provided. The raised floor is arranged as cooling air supply duct for the computers and has floor panels with cooling air outlets. It is equipped with underfloor cable junction units by which the computers are connected to permanent data cables running under the raised floor. The junction unit has a top side, wherein the top side or at least a major part of it is open to enable the passage of cooling air through the top side toward a floor panel with cooling air outlets.

According to another aspect, a computer center having a raised floor on which computers are arranged is provided. The raised floor is arranged as cooling air supply duct for the computers. It is equipped with underfloor cable junction units by which the computers are connected to permanent data cables running under the raised floor. The junction unit has opposite faces and comprises rows of connectors arranged on at least two levels one above the other at at least one of the faces. Open slits are provided in at least one of the faces between the rows of connectors to facilitate the passage of cooling air through the junction unit from face to face.

According to another aspect, a computer center having a raised floor on which computers are arranged is provided. The raised floor is equipped with underfloor cable junction units by which the computers are connected to permanent data cables running under the raised floor. The junction unit has opposite faces and comprises slide-in connector units able to be slid into the junction unit at at least one of its faces from outside. The slide-in connector units are arranged on at least two levels in the junction unit, one above the other.

According to another aspect, a computer center having a raised floor on which computers are arranged is provided. The raised floor is equipped with underfloor cable junction units by which the computers are connected to permanent data cables running under the raised floor. The junction unit has a frame structure with a frame. The frame comprising portal-like front parts and sidebars connecting the front parts, such that the portal like front parts are arranged opposite each other.

According to another aspect, a computer center having a raised floor on which computers are arranged is provided. The raised floor is equipped with underfloor cable junction units by which the computers are connected to permanent data cables running under the raised floor. The junction unit having faces and lateral sides. At least one of the faces is equipped with rows of connectors. At least one horizontal sidebar is arranged at each of the lateral sides. The sidebar is arranged to enable permanent cables coming from the inner side of connector rows to pass above and outwardly of the sidebar downwardly to a base floor and to be fixed to the sidebar. This arrangement obviates that the flow of cooling air is constricted by the permanent cables. Accordingly, it enables a small cooling air flow resistance to be achieved.

Other features are inherent in the underfloor cable junction unit and the computer center disclosed or will become apparent to those skilled in the art from the following detailed description of embodiments and its accompanying drawings.

DESCRIPTION OF THE DRAWINGS

Embodiments of the invention will now be described, by way of example, and with reference to the accompanying drawings, in which.

DESCRIPTION OF THE PREFERRED EMBODIMENTS

Figure 1:
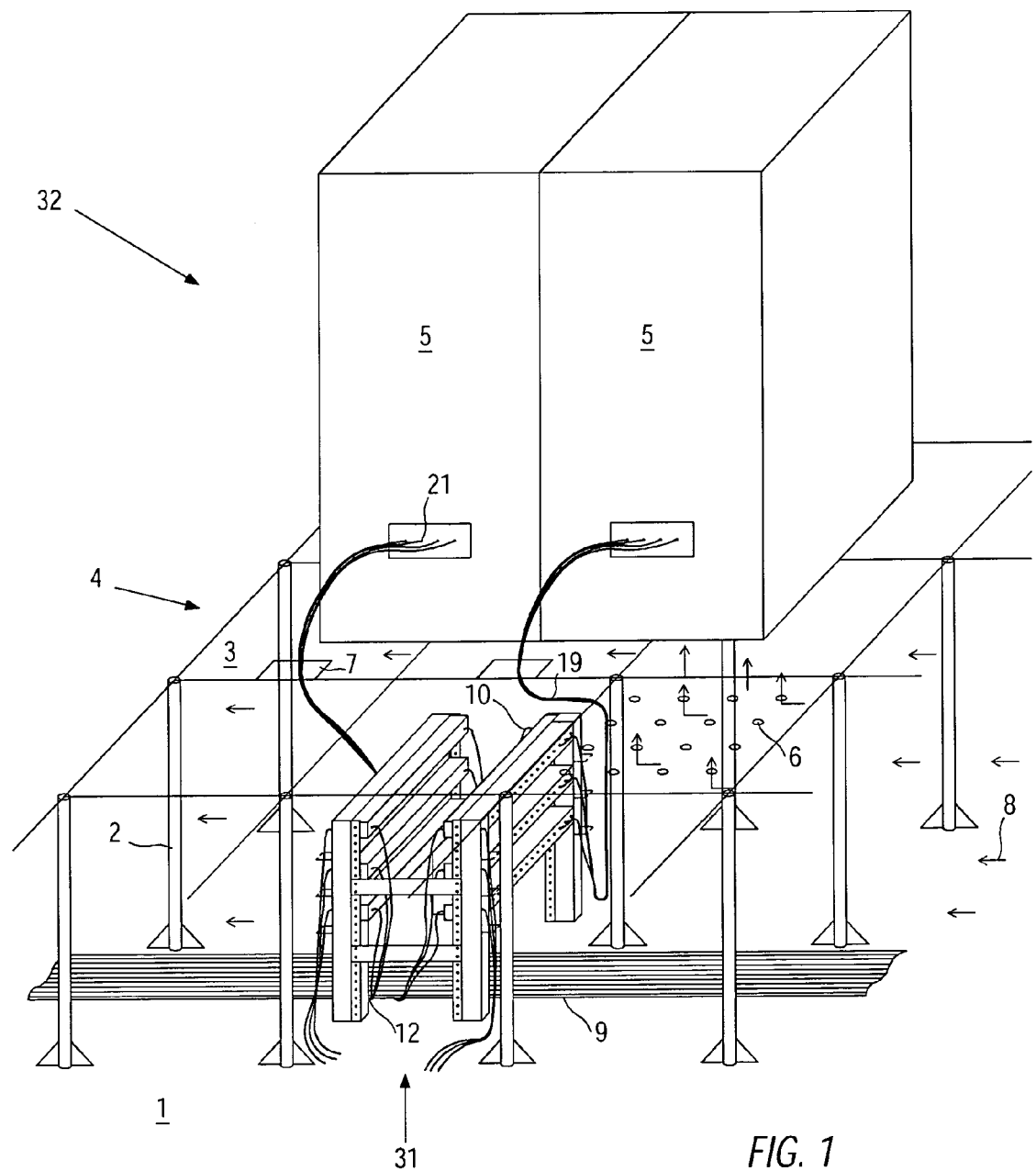
FIG. 1 illustrates, in a perspective view, a part of an exemplary computer room with computers arranged on a raised floor and an embodiment of an underfloor cable junction unit.

FIG. 1 illustrates, in a perspective view, a part of an exemplary computer room with computers arranged on a raised floor and an embodiment of an underfloor cable junction. Before proceeding further with the description, however, a few items of the embodiments will be discussed.

As mentioned at the outset, the volume under the raised floor of a raised-floor system is often used as a cooling air supply duct. Although in FIG. 8 only one floor panel with cooling air outlets beneath the module with the cable junction unit is shown, it is sometimes desired that such floor panels with cooling air outlets can also be disposed directly above cable junction units. However, since the prior art junction unit illustrated in FIG. 8 forms an obstacle for upwardly flowing air, due to its closed-box shape, a "hot spot" can arise above such a prior art junction unit, if a floor panel with cooling air outlets is disposed directly above it. A "hot spot" describes an air volume above the raised floor in which the temperature is considerably higher than the corresponding average temperature in the computer room. Such a local temperature increase may cause a malfunction of the adjacent computers. In order to avoid such "hot spots" when a floor panel with cooling air outlets is disposed directly above a junction unit, in some of the embodiments the top side of the underfloor cable junction unit or at least a major part of it is open to enable the passage of cooling air through it. In some embodiments, the lateral sides of the junction unit or at least a major part of them are also open, so as to improve the cooling air circulation.

Typically, the main direction of flow of the cooling air is parallel to the cable bunches. The junction units will normally be arranged such that their faces are oriented perpendicularly to the main direction of the cooling air flow. In order to facilitate the passage of cooling air through the junction units from face to face, in some of the embodiments open slits are provided in the perpendicularly arranged face of the junction unit between connector rows of the junction unit so as to diminish the cooling air flow resistance.

In some of the embodiments the connector rows are arranged on at least two levels one above the other. This enables higher port densities to be achieved (i.e. number of ports per floor module or per square meter) than in single-level arrangements, for example a port density higher by a factor 8 to 24. Since the development of server computer technology has led to an ever-increasing number of ports per footprint of a server computer, the port density provided by an underfloor cable junction unit may be the limiting factor for the number of computers with which a given computer room can be equipped. Therefore, the embodiments with a multi-level arrangement of the connector rows enable a computer room to be equipped with a relatively large number of computers.

In some of the embodiments, the rows of connectors are accommodated by slide-in units which can be slid into the junction unit on different levels at its faces from the outside. For example, the slide-in units are standard 19-inch units. For example, each 19-inch unit has 24 linearly arranged connectors, such as RJ45, RJ11, 25-pin sub-D, V35, X21, RS232, SC, ST, E2000, MTRJ and/or LC connectors (this enumeration is only exemplary; any connector type may be used). RJ45 connectors, for example, may be Category 5 or 6 connectors (according to the standard EN 50173).

The slide-in units may be fixed to the junction unit in a dismountable manner (e.g. by means of screws or clamps) to enable them to be removed, replaced or changed in their position or to enable further slide-in units to be mounted, without dismounting the junction unit.

Figure 8:
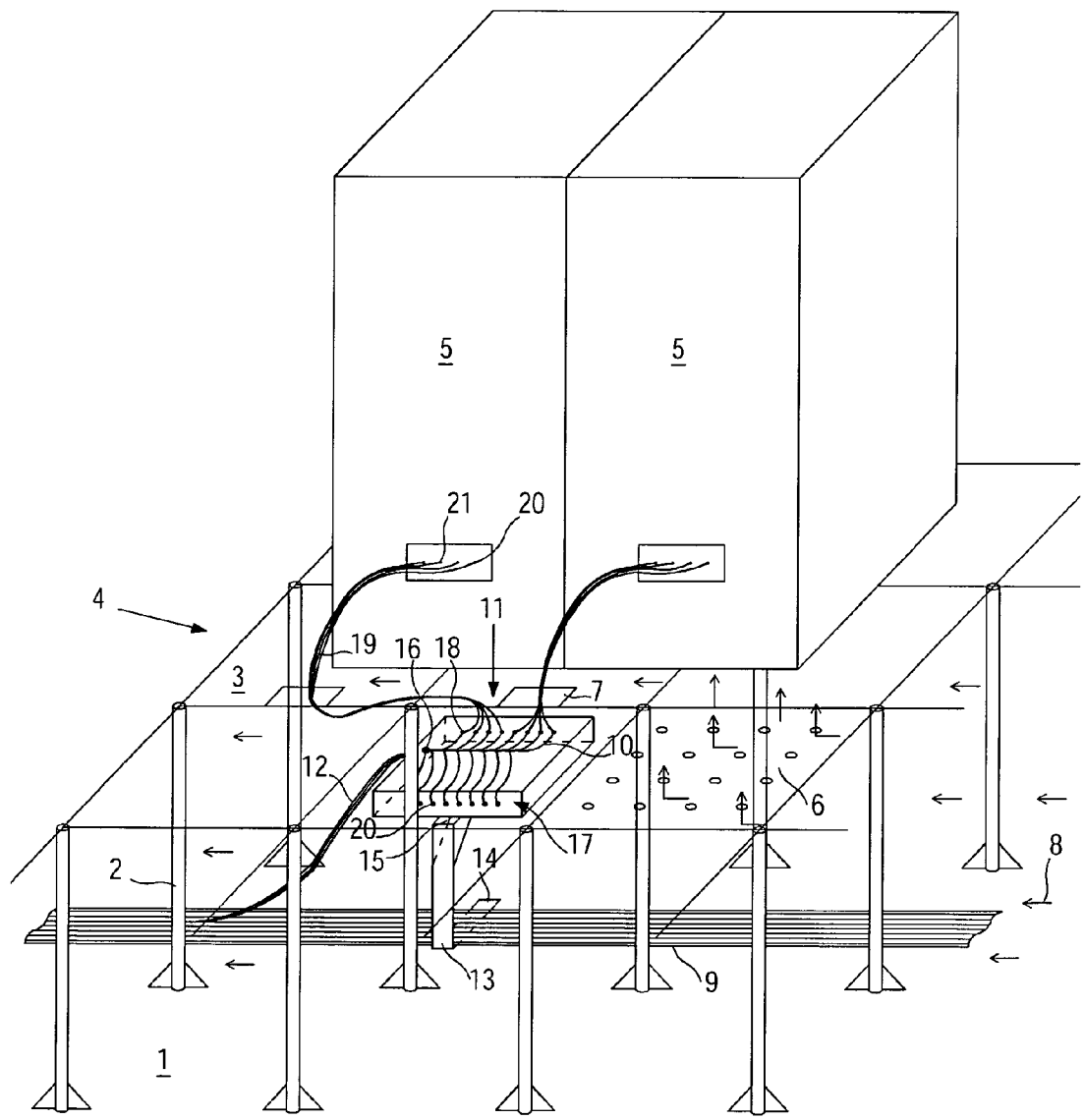
FIG. 8 illustrates, in a perspective view similar to FIG. 1, a part of a computer room with computers arranged on a raised floor and underfloor cable junction units, as used in the prior art.

Whereas the prior art junction units illustrated in FIG. 8 are only single-type units (i.e. they provide either copper data cable connectors or optical fiber connectors), in some of the embodiments the connector rows are at least one of copper data cable connector rows or optical fiber connector rows. In other words, these embodiments can optionally be equipped with data cable connector rows and optical fiber connector rows, thereby realizing a mixed-type junction unit.

In those embodiments of the junction unit equipped with optical fiber connector rows the optical fiber connectors are preferably of a connector type which enables pre-fabricated optical break-out cables, which have pre-installed cable connectors, to be plugged in at a permanent cable connection side of the junction unit connectors, without using a splice box. An exemplary optical fiber connection system is the E2000 system. In this system, both permanent cables and patch cables bear the same connectors, and the junction unit connectors are feed-through connectors, into which a permanent cable connector and a patch cable connector are plugged from the two opposite sides. The permanent cable connector can be fixed in the respective junction unit connector by removing a detent clip from the permanent cable connector which is normally to be depressed if a plugged-in connector is to be unplugged. The fact that no splice box is required increases the achievable port density. In addition, the use of pre-fabricated optical break-out cables with pre-installed cable connectors facilitates the installation procedure and enhances the reliability of the optical connections. In a similar manner, pre-manufactured permanent copper cables may be used in order to obviate connector installation work in the computer room. For example, the permanent cables may be equipped with preinstalled female RJ45 connectors, and the patch cables with male RJ45 connectors. The junction unit connectors are then feed-through connectors that accommodate the pre-installed female RJ45-connectors from the permanent cable connection side of the junction unit, and enable the male RJ45-connectors to be plugged in from the outside of the junction unit.

In some of the embodiments, the rows of connectors are arranged at two opposing faces of the junction unit. The connectors are arranged such that the permanent cable connections are provided at the inner side of the connectors (i.e. the side facing the inside of the junction unit), and plug-in patch cable connections are provided at the outer side of the connectors (i.e. the outward-facing side of the junction unit), which is, for example, in contrast to the junction unit disclosed in JP 10028313 A, in which the permanent cable connections are provided at the junction unit's outer side. If the floor modules adjacent to the faces with the connector rows are left free (i.e. are not equipped with junction units or the like), the arrangement of the connectors enables a technician to access the connectors easily and establish or change patch cable connections, despite the high port density. The slits between the connector rows in the two opposing faces are preferably aligned in the horizontal direction the two opposing faces so as to minimize the cooling air flow resistance.

The faces of the cable junction unit are defined as those sides which are arranged perpendicularly to the longitudinal direction of the cable bunches running on the base floor, and the lateral sides of the cable junction unit are defined as those sides arranged parallel to this direction. In the prior art junction units illustrated in FIG. 8, the permanent cables or cable bundles leave the cable unit in the center of its face and hang freely which impairs the face's accessibility and increases the risk of the permanent cable being damaged. In some of the embodiments, the junction unit further comprises at least one horizontal sidebar arranged at the lateral sides of the junction unit. The sidebar is positioned such that it enables permanent cables coming from the inner side of the connector rows to pass above and outwardly of the sidebar downwardly to the base floor. The permanent cables running in this way can be fixed to the sidebar, e.g. by cable ties. This improves the accessibility of the junction unit's faces (on which the connector rows are arranged in the embodiments) and eliminates the risk of the permanently connected cables being damaged.

Similarly, in the prior art junction unit illustrated in FIG. 8, the patch cables leave the junction unit in a manner which impairs the accessibility and, since the patch cables run freely through the volume under the raised floor, makes them prone to damage (e.g. if a floor panel is removed and a heavy object such as a tool is inadvertently dropped into the open floor module, a patch cable connector may easily be broken). Some of the embodiments, however, comprise patch cable guiding elements which are arranged laterally on the faces of the junction units which are equipped with connector rows. These guiding elements enable patch cables plugged into the connectors to be guided laterally on the respective face of the junction unit downwardly to the base floor.

The junction unit of some of the embodiments has a frame structure. The frame comprises portal-like face parts and sidebars connected to the face parts, such that the face parts are arranged opposite each other. Several mounting positions are provided for the sidebars to enable them to be mounted at different heights. Permanent cables coming from the inner side of the connector rows pass above and outwardly of the sidebar downwardly to the base floor. In other words, the permanent cables are bent by about 90° from a horizontal into a vertical orientation. The height of the sidebar relative to the (nearest) connector row defines the minimum bending radius. Therefore, by choosing a certain vertical minimum distance between the sidebar and the (nearest) detector row, a required minimum bending radius can be ensured. Since the connector rows may be flexibly mounted at a desired height and connectors for different cable types requiring different minimum bending radii can be flexibly mounted, the fact that several mounting positions are provided for the sidebars provides full modular flexibility while enabling the junction unit to be set-up in a way which ensures the minimum bending radius for the cable type used in a specific case. Preferably, the sidebars are mounted to the face parts in a dismountable manner to enable them to be replaced or their mounting height to be changed. By this measure, the modular junction units can be adapted so as to ensure the minimum bending angle requirement even if they are already mounted, for example when additional detector rows are installed or existing detector rows are moved to different mounting positions.

Since in some of the embodiments, the junction unit is designed as an open frame rather than in the form of a closed box, the junction connectors themselves are preferably provided with enclosures. Such connector enclosures do not constrict the cooling air flow (or, at least, do not constrict it as much as the prior art closed-box design), while protecting the interior of the junction unit connectors from dirt etc.

In some embodiments the portal formed by the face parts is not closed at the bottom, i.e. has no horizontal bottom bar, but only two posts which rest on the base floor. The cable junction unit can then be installed above an already existing cable bunch. This is advantageous when an already existing computer room installation is extended. In other embodiments the portal is closed at the bottom, i.e. the face parts have a horizontal bottom bar. These embodiments are used when the junction units are installed prior to the laying of the permanent cables.

In some embodiments the junction unit's height and/or width (e.g. the length of the sidebars) is variable which enables it to be adapted to different raised-floor heights and different floor module dimensions.

As was mentioned above, in the prior art the cable bunches running under the raised floor are usually guided by cable trays mounted on the base floor. In the some of the embodiments, both faces of the junction unit are open at least at their lower parts to enable bunches of permanent cables to pass through the junction unit, whereby the permanent cable bunches are encompassed and thereby guided. If several junction units are arranged in a series (e.g. in every second or third module of a row of floor modules) the junction units take over the guiding function of the prior art cables trays. Therefore, preferably, a computer room equipped with the junction units is not equipped with cable trays or the like, at least in those parts of the room which are equipped with the junction units.

Some of the embodiments of the underfloor cable junction unit are designed in a modular manner, the module parts of which are commercially available standard parts or are at least based on such standard parts. The modularity of the design enables the junction unit to be easily adapted to particular requirements of the data connections to be provided, to particular raised-floor heights, and to a certain extent, to particular dimensions of the floor panel modules. This adaptability has two aspects:

(i) adaptability to particular requirements at the time of the installation of the junction unit; and (ii) adaptability of an already installed junction unit to later changes of requirements. The embodiments are superior over the prior art design illustrated in FIG. 8 in both aspects. Several items regarding adaptability are discussed in more detail below.

In the embodiments, the cable junction unit is designed to be mounted on the base floor on which the raised floor is posted. The cable junction unit is dimensioned such that it can be lowered through a module opening which is present when a module panel of the discrete modular raised-floor system is removed.

The term "underfloor cable junction unit" is meant to include also cable junction units to be mounted in a suspended ceiling (hanging at the solid ceiling, above the suspended ceiling) or at a wall (for example, hanging laterally at the wall of a cable chute).

The described embodiments not only disclose underfloor cable junction units, but also a computer center having a raised floor on which computers are arranged. The volume under the raised floor is equipped with underfloor cables junction units as described above. The computers are connected to permanent data cables running under the raised floor by means of the junction units. An embodiment of the computer center further comprises active network elements and network element junction units. The permanent data cables permanently connect the underfloor cable junction units and the network element junction units. Patch cables for the connection of the computers to the underfloor cable junction units (also called "first patch cables") as well as patch cables for the connection of the active network elements to the network element junction units (also called "second patch cables") are provided.

Returning now to FIG. 1, it illustrates an embodiment of an underfloor cable junction unit 31 used in a computer room 32 with a raised-floor system in which the floor panels are shown to be transparent. On a base floor 1, floor columns 2 support floor panels 3 which together form a raised floor 4. The raised-floor system is a modular system in which the floor panels 3 are typically in the form of squares, for example with the dimension of 60 cm×60 cm, which rest on a square frame which in turn rests on the floor columns 2 arranged at the square corners. The height of the raised floor is typically 50 cm to 70 cm, but there are also installations of only about 30 cm. Computers 5 (only two of them are shown in FIG. 1) are placed on the raised floor 4.

Whereas the basic type of floor panel 3 has a completely closed surface, there are special floor panels with cooling air outlets 6 and floor panels with a cable aperture 7. Cooling air 8 flows in the volume under the raised floor 4 in a certain direction (from right to left in FIG. 1), and at each floor panel 3*a* some of the cooling air is branched off upwardly, flows through the cooling air outlets 6 and is partly sucked in by the nearby computers 5. Although in FIG. 1 only one floor panel with cooling air outlets 6 beneath the module with the cable junction unit 31 is shown, in real applications a larger fraction of such floor panels will be used, and in particular, floor panels with cooling air outlets 6 are also disposed directly above cable junction units 31.

The room under the raised floor 4 also accommodates the cabling of the computer room 32. For example, in FIG. 1 bunches 9 of data cables run from a data communication room (not shown in FIG. 1) on the left-hand side of FIG. 1 on the base floor 1 from the left to the right in FIG. 1 (only one cable bunch 9 is shown in FIG. 1). The cable bunches 9 comprise individual data cables 10 or bundles 11 of data cables.

A plurality of underfloor cable junction units 31 are arranged throughout the computer room 32 under the raised floor 4, one of which is illustrated in FIG. 1. The cable junction unit 31 is a cube-like dimensioned open frame mounted directly on the base floor 1. It encompasses and thereby guides the cable bunch 9 so that cable trays or the like usually required in prior art installations as shown in FIG. 8 can be omitted. On each of the two faces 33 (that is, portal front parts) of the junction unit 31 there are rows 47 of connectors (or ports) 48 on three levels, one above the other. Since, for example, one row 47 has twenty-four connectors 48 only sixteen are shown in the figures, the total number of connectors 48 of the exemplary embodiment shown in FIGS. 1 to 4 is higher by a factor nine compared to the prior art junction unit illustrated in FIG. 8. Due to the arrangement of the connectors 48 on the faces 33 of the junction unit 31, they are easily accessible from the floor module adjacent to the direction of the cable bunch 9, in spite of the high port density.

The cable junction unit 31 is equipped with rows 47 of copper cable connectors 48*a* (e.g. RJ45, RJ11, 25-pin sub-D, V35, X21, RS232 connectors) and optical fiber connectors 48*b* (e.g. SC, ST, E2000, MTRJ, LC connectors) in a mixed manner. If the optical cables used are pre-fabricated break-out cables with pre-installed cable connectors, there is no need to equip the junction unit with splice boxes (however, of course, the junction unit may be equipped with one ore more splice boxes if, in a particular installation, optical cables that are not pre-fabricated break-out cables are used).

Open slits 36 are provided in the faces 33 of the junction unit 31 between the connector rows 47. These slits 36, together with the lower open part which enables the cable bunch 9 to pass through the junction unit 31, ensure that cooling air can pass through the junction unit 31 from face 33 to face 33, without significant constriction. Since the junction unit 31 is open at its top 37, a sufficient amount of cooling air is branched off upwardly, when a floor panel 3*a* with cooling air outlets 6 is disposed directly above the junction unit 31.

As shown in FIG. 1, the bundles of permanent data cables 12 which are permanently connected to the connectors 48 are branched off from the cable bunch 9 under the junction unit 31 and run upwardly at its lateral sides between the two faces 35 of the junction unit 31, where they are fixed to one or more sidebars 35. Above the sidebar 35 appropriate for the level or the connector row 47 to be connected, they are bent inwardly to reach the rear sides of the respective connectors 48.

The cabling described so far, is permanent, i.e. it is not changed when the configuration of computers 5 to be connected is changed. Rather, the part of the cabling which is adaptable to a particular computer configuration is constituted by the patch cables 19 with suitable cable connectors 20 at both ends. The (typically flexible) patch cables 19 connect the connectors 48 with computer ports 21. They are plugged in the connectors 48 of the junction unit 31 from the outside and run downwardly on the lateral edges of the faces 33 to the base floor 1, and on the base floor 1 towards the computer 5 to be connected, run upwardly and pass through the cable aperture 7 next to the computer 5 to be connected, and then run on the raised floor 4 to the computer 5.

Figure 2:
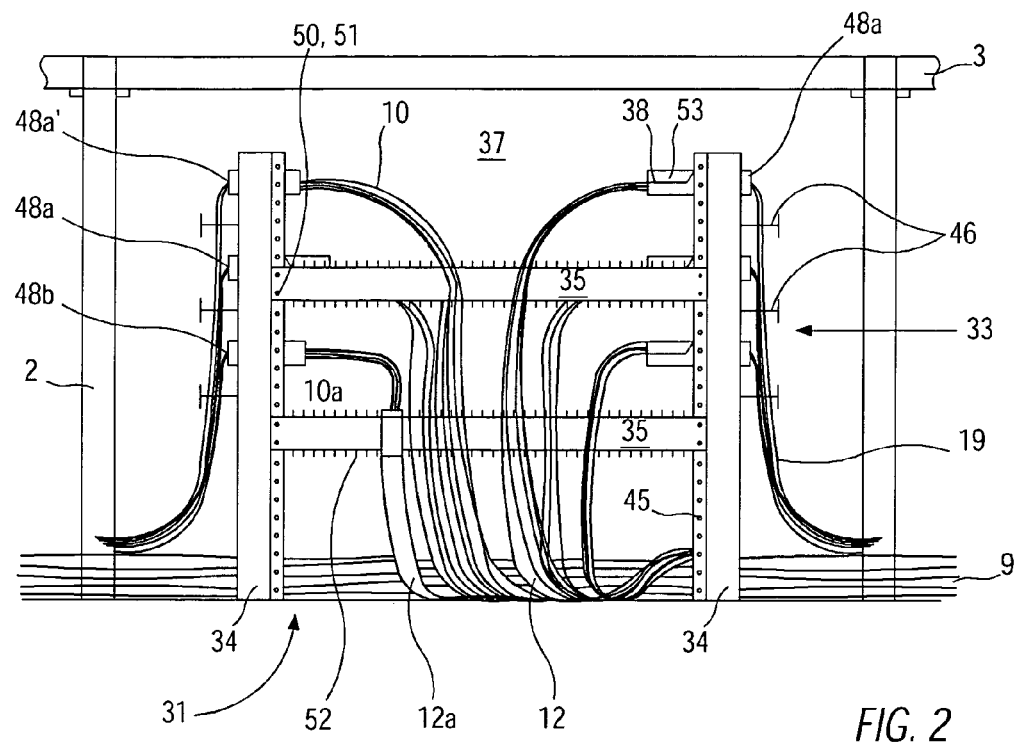
FIG. 2 shows a more detailed side view of the underfloor cable junction unit of FIG. 1.
Figure 3:
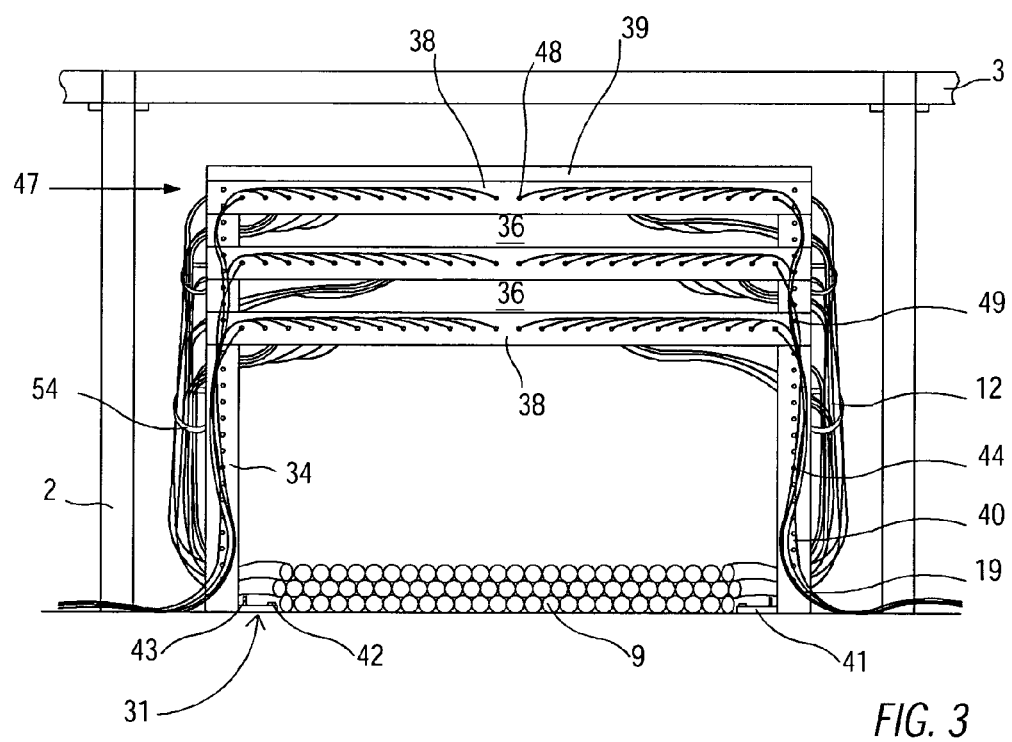
FIG. 3 shows a more detailed front view of the underfloor cable junction unit of FIG. 1.
Figure 4:
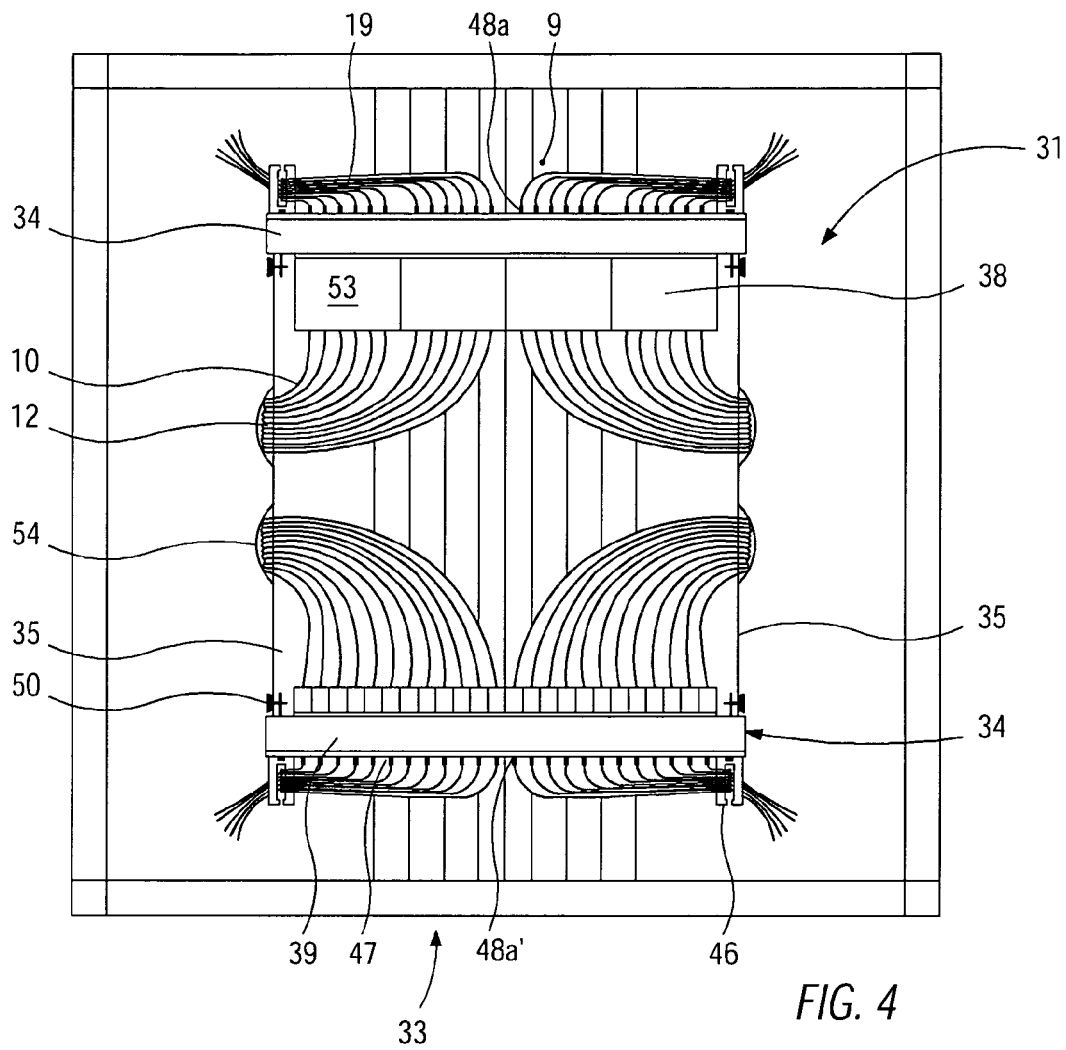
FIG. 4 shows a more detailed top view of the underfloor cable junction unit of FIG. 1.

FIGS. 2 to 4 show in more detail side, front and top views of the underfloor cable junction unit 31 of FIG. 1. Also shown in FIGS. 2 to 4 are the surrounding parts of the raised-floor structure. The top view of FIG. 4 illustrates what is seen from above if the floor panel 3 over the cable junction unit 31 is removed.

The cable junction unit 31 is made up of face parts 34, sidebars 35 and slide-in units 38. The face part 34 is portal-like and has an upper horizontal bar 39, two vertical lateral bars 40 and lower horizontal projections 41 (the terms "horizontal" and "vertical" refer to the normal installation position of the junction unit 31). The horizontal projections 41 each have a mounting hole 42 (preferably an elongated hole) and a grounding pin 43. In other embodiments a horizontal bottom bar 41*a* (FIG. 6) connecting the two lateral bars 40 is provided instead of the two horizontal bars 41. Since the portal is then closed, its stability is improved. These embodiments with closed portal are used when the junction unit is installed on the base floor 1 prior to the laying of the cable bunches 9.

The vertical lateral bar 40 has a vertical row of threaded holes 44 at its face and, at right angles, another vertical row of threaded holes 45 at its lateral side. Slide-in units 38 and patch cable guiding elements 46 can be fixed to the face part 34 at variable levels by means of screws 49 using one or more of the threaded holes 44 on the appropriate level. Similarly, the sidebars 35 can be fixed to two face parts 34 on a desired level by means of screws 50 in one or more of the threaded holes 45. The cable guiding elements 46 resemble a fork, the outer end of which is partly closed. The threaded holes 44, 45 are arranged at equal spaces between adjacent holes. This defines a discrete height raster and enables the slide-in units 38 and sidebars 35 to be easily mounted horizontally and in pre-defined heights.

In other embodiments (not shown) continuously lockable clamps can be provided for mounting the slide-in units 38, the cable guiding elements 46 and/or the sidebars 35 instead of the above-described screw and threaded-hole arrangement.

The sidebars 35 are equipped with holes 51 at their ends to enable them to be mounted laterally to two opposing face parts 34 by means of screws 50 and threaded holes 45, as described above. The upper and lower edges of the sidebars 35 have a comb-like shape with upwardly and downwardly extending tines 50.

The slide-in units 38 include the rows 47 of connectors 48. They are standard units, preferably with a width of nineteen inches. Each slide-in unit 38 has twenty-four RJ45, RJ11, 25-pin sub-D, V35, X21, SC, ST, E2000, MTRJ or LC connectors. The slide-in units 38 are provided with enclosures 53 which protect the interior of the connectors 48. Slide-in units 38 may be equipped with feed-through connectors, for example optical feed-through connectors of the E2000 system or RJ45 copper feed-through connectors (i.e. female snap-in connectors). In FIGS. 2 and 4 one of the rows of connectors 48 is a row of RJ45 Category 6 feed-through connectors, denoted by 48a', whereas the other RJ45 connectors-are Category 5 connectors denoted by 48a. Optionally, the slide-in units 38 can be equipped with lateral cable guides 57 in the form of downwardly curved troughs (FIG. 5) which are an additional means besides the sidebars 35 of ensuring that the bending radius does not fall below the required minimum value. This is particularly advantageous for slide-in units with optical connectors. Since the cable guides 57 stand over laterally, a slide-in unit 38 with already mounted cable guides 57 has to be tilted to enable the slide-in unit 38 to be slid into or pulled out of the junction unit 31. Alternatively, the cable guides 57 are mounted to the slide-in units 38 before they are slid into the junction unit 31. The slide-in units 38 are equipped with holes near their lateral edges to enable them to be mounted at the faces 33 of the cable junction unit 31 by means of the screws 49 in the threaded holes 44 on an appropriate level.

In order to assemble the cable junction unit 31 from the above-described pieces, two or more sidebars 35 are mounted to each side of two opposing face parts 34 (for installations with a low-raised floor, only one sidebar per side may be sufficient). The resulting frame is a tube-shaped open frame. The height at which the sidebars 35 are mounted depends on the height at which the slide-in units 38 are mounted and which type of data cable is used. The height is to be chosen appropriately so that the data cables to be fixed to the sidebars 35 are not bent beyond the required minimum bending radius. The required number and type of slide-in units 38 are slid into the portal-like opening of the face parts 34 from the outside and secured by means of the screws 49 in the holes 44. This is done In such a manner that slits 36 remain free between the units 38. In the example shown in FIGS. 2 to 4 five units 38 with copper cable connectors (that is patch cable connectors) 48a and one unit 38 with optical connectors 48b has been mounted.

The assembled junction unit 31 is then fixed to the base floor 1 using the mounting holes 42. The unit 31 is dimensioned such that it can be lowered through a module opening of an already installed raised-floor system. Since the embodiment shown in FIGS. 2 to 4 has no horizontal bottom bar, it can be installed above an already existing cable bunch 9. However, if the cables are only laid after the installation of the junction unit 31, another embodiment with such a horizontal bottom bar is preferred.

The bundles of permanent data cables 12 which are to be connected to the connectors 48 of the junction unit 31 are branched off from the cable bunch 9 running through the junction unit 31 between the face parts 34. They run upwardly at the junction unit's lateral sides, where they are fixed to the sidebars 35 with cable ties 54. Above the appropriate sidebar 35 they are bent inwardly to the rear side of the connectors 48 to which they are permanently connected. If an optical breakout cable is used, it is fixed in such a manner that the bundle cable (denoted with "12a" in FIG. 3) as a whole is fixed to the sidebar 35, and the point where the bundle cable 12a is split up into individual optical fiber cables (denoted with 10a in FIG. 3) is above the corresponding sidebar 35.

The patch cables 19 are plugged into the connectors 48 and are inserted into the lateral cable guiding elements 46 so that they first run nearly horizontally from the connectors 48 to the sides of the junction unit 31 and, from there downwardly, guided by the cable guiding elements 46 to the base floor 1, thereby maintaining free access to the lower connector rows 47. The cable guiding elements 46 ensure that the patch cables 19 run in an ordered manner aligned with the vertical lateral bars 40 and the front faces of the slide-in units 38, so that the connectors 48 of the different rows 47 remain accessible and the air flow resistance of the cabled junction unit 31 is not much increased by the patch cables 19. They also function as a traction relief; i.e. a patch cable 19 can not be unplugged by pulling on it from the computer connector end.

The cable junction unit 31 can be used in a flexible way: different types of connector can be used in one and the same junction unit 31. The number of connectors 48 can be varied within certain limits (in special circumstances, it is even possible to fill the slits 36 with additional slide-in units 38); in an already installed junction unit 31 the number and type of connector can be changed; the junction unit 31 can be installed in existing installations with a plurality of cables already running on the base floor; by using shorter or longer sidebars 35 the junction unit 31 can be, within certain limits, adapted to differently sized floor modules.

Figure 5:
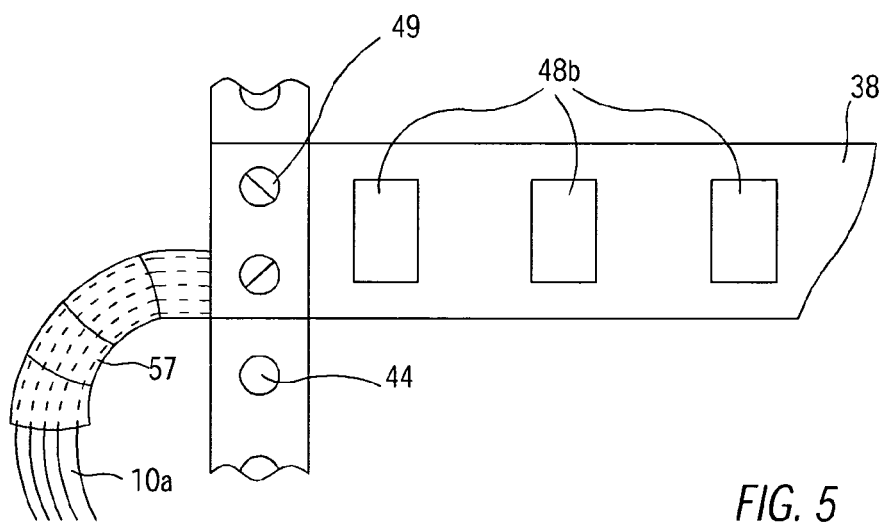
FIG. 5 shows a cut-out of the front view of FIG. 3, in which a curved cable guide is visible.
Figure 6:
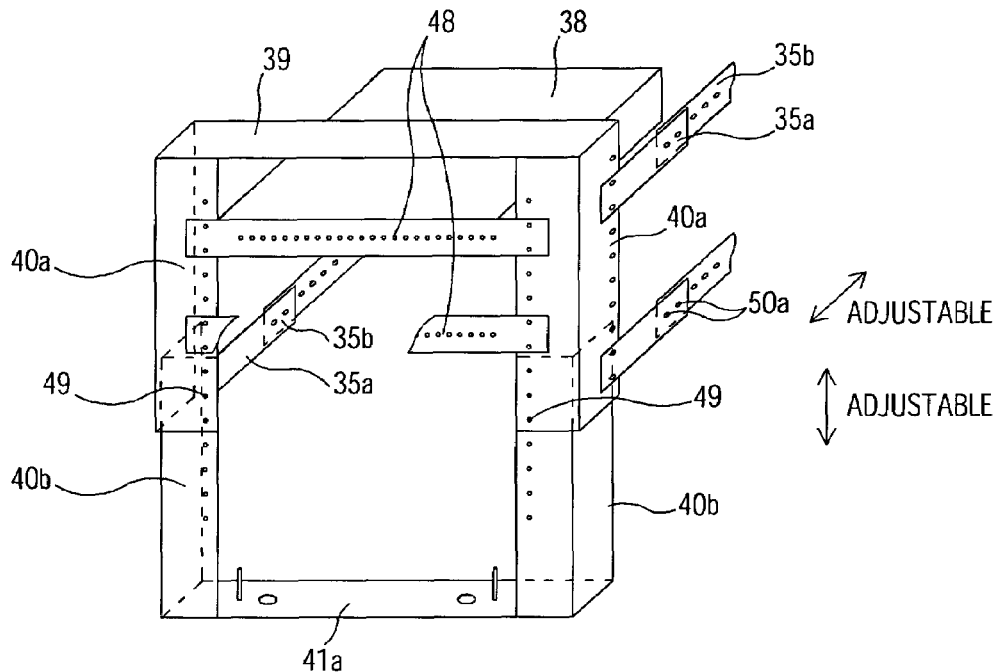
FIG. 6 illustrates schematically another embodiment which adjustable height and width.
Figure 7:
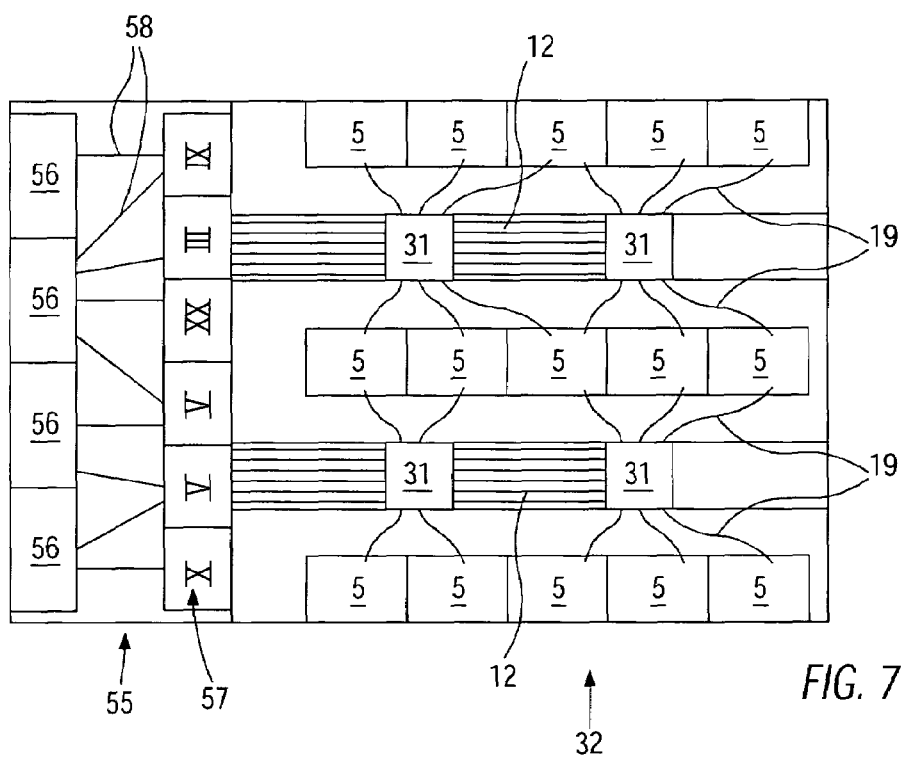
FIG. 7 illustrates schematically a computer center equipped with underfloor cable junction units as shown in FIGS. 1 to 6.

FIG. 6 illustrates schematically another embodiment which adjustable height and width. The height adjustability is achieved by a telescopic design of the vertical lateral bars, the two telescopic parts are denoted with 40a and 40b in FIG. 6. Similarly, the width adjustability is achieved by a telescopic design of the sidebars, the two telescopic parts are denoted with 35a and 35b in FIG. 6. A desired height and width can, for example, be secured by screws 49 and 50a. It is clear that embodiments with either height adjustability without width adjustability or width adjustability without height adjustability are also useful, depending on particular needs. The above and following description of technical features of the junction unit 31 and the computer room 32 also applies to such embodiments with adjustable height and or width. FIG. 7 is a schematic top view of a computer center equipped with underfloor cable junction units 31 as shown in FIGS. 1 to 4. The computer center comprises a computer room 32 and a data communication room 55. The computer room 32 houses a plurality of computers 5, whereas the data communication room 55 houses active network elements 56, such as routers, switches etc. to which the computers 5 are connected. The major part of the length of these connections is provided by the permanently installed data cables 10 (or bunches 9 of such cables) which permanently link network element junction units 57 located in the data communication room 55 with a plurality of (the above-described) underfloor cable junctions 31 which are distributed throughout the computer room 32 under the raised floor 4 (six such junction units 31 are depicted in FIG. 5). First patch cables 19 connect the computers with nearby underfloor cable junction units 31, and second patch cables 58 provide connections between the network element junction units 57 and the respective active network elements 56, as required for a particular configuration of computers 5 and active network elements 56. If the configuration changes, which is often the case in a computer center, only the first and/or second patch cable connections have to be changed.

With the embodiments, a high port density can be achieved which enables a computer center to be equipped with a higher density of computers. Despite the high port density, the forming of hot spots above the cable junction units is avoided. Due to their elaborate, but at the same time simple and modular design, the costs for manufacturing and installing the embodiments and for laying the permanent and patch cables are considerably lower than for prior art designs.

All publications and existing systems mentioned in this specification are herein incorporated by reference.

Although certain products constructed in accordance with the teachings of the invention have been described herein, the scope of coverage of this patent is not limited thereto. On the contrary, this patent covers all embodiments of the teachings of the invention fairly falling within the scope of the appending claims either literally or under the doctrine of equivalence.

What is claimed is:

1. An underfloor cable junction unit installed in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the slide-in connector units being arranged on at least two levels in the junction unit, one above the other and being spaced vertically from each other to provide passage of cooling air in the duct through the junction unit between the opposite faces.

2. The underfloor cable junction unit of claim 1 wherein the space beneath the raised floor is arranged as a cooling air supply duct for devices adapted to be arranged on the raised floor, the raised floor having floor panels with cooling air outlets and the connectors are for connecting data cables for the devices to each other, the junction unit having (a) a top side, wherein the top side or at least a major part of it is open to enable passage of cooling air through the top side toward a floor panel of the raised floor, the panel including cooling air outlets, (b) a structure for mounting the junction unit in the supply duct, and (c) lateral sides, the lateral sides or at least a major part of them being open for enabling cooling air to flow through the lateral sides and thereby form part of the cooling air supply duct while the cable junction unit is installed in the duct.

3. The underfloor cable junction unit of claim 2, wherein the mounting structure is arranged to be mounted on a base floor on which the raised floor is posted.

4. The underfloor cable junction unit of claim 2, having opposite faces and comprising rows of connectors for data cables, the rows being arranged on at least two levels, one above the other, at at least one of the faces of the junction unit having open slits between the rows of connectors to facilitate the passage of cooling air through the junction unit from face to face.

5. The underfloor cable junction unit of claim 2, which is arranged to be adjustable in width and height to enable lowering of the unit through any standard sized module opening which is present when a module panel of a discrete modular raised floor system is removed.

6. The underfloor cable junction unit of claim 1 wherein the unit has opposite faces on different horizontally spaced members and comprising rows of connectors arranged on at least two levels, one above the other, both of the faces including open slits between the rows of connectors to provide passage of cooling air in the duct through the junction between both of the faces, the open slits thereby forming part of the cooling air supply duct while the cable junction unit is installed in the duct.

7. The under-floor cable junction unit of claim 1, wherein the slide-in connector units are fixed to the junction unit in a dismountable manner to enable them to be removed, replaced or changed in their position or enable further slide-in units to be mounted, without dismounting the junction unit.

8. The underfloor cable junction unit of claim 1, wherein the slide-in connector units have data connector rows, at least some of the connector rows, including at least one of copper data cable connector rows and optical fiber connector rows.

9. The underfloor cable junction unit of claim 8, having optical fiber connector rows with connectors for enabling pre-fabricated optical break-out cables with pre-installed cable connectors to be plugged-in at the permanent-cable connection side of the junction unit connectors, without using a splice box.

10. The underfloor cable junction unit of claim 1, arranged to accommodate slide-in connector units on the two opposing faces of the junction unit.

11. The underfloor cable junction unit of claim 1 wherein the junction unit has an inside, and wherein connectors of the slide-in connector units are arranged such that permanent cable connections are at an inner side of the connectors facing the inside of the junction unit and plug-in patch cable connections are at an outward-facing side of the connectors.

12. The underfloor cable junction unit of claim 1 wherein the junction is included in a computer center having a raised floor on which computers are arranged, said raised floor being included in the cooling air supply duct, the cooling air supply duct being for cooling the computers and having floor panels with cooling air outlets, said raised floor being equipped with underfloor data cable junction units by which the computers are connected to permanent data cables running under the raised floor, each junction unit having a top side, wherein the top side or at least a major part of it is open to enable passage of cooling air through the top side toward a floor panel with cooling air outlets.

13. The underfloor cable junction unit of claim 1 wherein the junction is included in a computer center having a raised floor on which computers are arranged, said raised floor including air outlets for supplying cooling air to the computers, space beneath the raised floor being included in the cooling air supply duct, the cooling air supply duct being for cooling the computers, said raised floor being equipped with at least one of the underfloor cable junction units that connects the computers to permanent data cables running under the raised floor, each junction unit having opposite faces and comprising rows of connectors arranged on at least two levels, one above the other, at at least one of the faces, wherein open slits are in at least one of the faces between the rows of connectors to facilitate passage of cooling air through the junction unit from face to face.

14. The underfloor cable junction unit of claim 1 wherein the junction is included in a computer center having a raised floor on which computers are arranged, said raised floor being equipped with at least one of the underfloor cable junction units that connects the computers to permanent data cables running under the raised floor.

15. The underfloor cable junction and computer center of claim 14, wherein each junction unit has a frame structure with a frame, the frame comprising portal front parts and sidebars connecting the front parts, such that the portal front parts are arranged opposite each other, the side bars carrying the slide-in connector units.

16. The underfloor cable junction unit of claim 1 wherein the junction is included in a computer center having a raised floor on which computers are arranged, said raised floor being equipped with at least one of the underfloor cable junction units that connect the computers to permanent data cables running under the raised floor, each junction unit having faces and lateral sides, wherein at least one of the faces is equipped with rows of connectors, and at least one horizontal sidebar is arranged at each of the lateral sides, the at least one horizontal sidebar being arranged to enable permanent cables coming from the inner side of connector rows to pass above and outwardly of the sidebar downwardly to a base floor and to be fixed to the sidebar.

17. The underfloor cable junction and computer center of claim 16, further comprising:
  active network elements and network element junction units, wherein the permanent data cables permanently connect the underfloor cable junction units and the network element junction units,
  first patch cables for the connection of the computers with the underfloor cable junction units, and
  second patch cables for the connection of the active network elements with the network element junction units.

18. The underfloor cable junction unit of claim 1 wherein the junction is included in a computer center having a raised floor on which computers are arranged, said raised floor including air outlets for supplying cooling air to the computers, space beneath the raised floor being arranged as the cooling air supply duct, the cooling air supply duct being for cooling the computers, said raised floor being equipped with at least one of the underfloor cable junction units that connect the computers to permanent data cables running under the raised floor, each junction unit having first, second, third, and fourth legs on a subfloor beneath the raised floor, the first and second legs being in a first plane, the third and fourth legs being in a second plane parallel to the first plane, the first and third legs being in a third plane at right angles to the first and second planes, and the second and fourth legs being in a fourth plane parallel to the third plane; a first sidebar connected between the first and second legs; a second sidebar connected between the third and fourth legs; the permanent data cables extending longitudinally in the direction of the first and second sidebars and between the legs; a first face part extending between the first and third legs; a second face part extending between the second and fourth legs; the slide-in units being on one of the face parts, the slide-in units including first data connectors having longitudinal axes extending parallel to the sidebars and connected to data cables having ends positioned at opposite sides of the first data connectors along the longitudinal axes, the junction unit being arranged so cooling air in the supply duct can flow under and over each of the sidebars and face parts, and an opening for flow of cooling air extending from just above the subfloor to an air outlet between the sidebars and face parts.

19. The junction unit and computer center of claim 18, wherein each of the face parts includes a row of second data connectors, the second data connectors having longitudinal axes extending parallel to the sidebars for connection to data cables having ends positioned at opposite sides of the second data connectors along the longitudinal axes.

20. The unit of claim 1, in combination with the raised-floor system, wherein the unit is below the raised floor of the raised-floor system, and is on a structure on a base floor beneath the raised floor.

21. An underfloor cable unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the unit having slide-in connector units being arranged on at least two levels in the junction unit, one above the other and being spaced vertically from each other to provide passage of cooling air in the duct through the junction unit between the opposite faces, opposite faces on different horizontally spaced members and comprising rows of connectors arranged on at least two levels, one above the other, both of the faces including open slits between the rows of connectors to provide passage of cooling air in the duct through the junction between both of the faces, the open slits thereby forming part of the cooling air supply duct while the cable junction unit is installed in the duct, the junction unit having a top side, wherein the top side or at least a major part of it is open to enable the passage of cooling air through the top side and thereby form part of the cooling air supply duct while the cable junction unit is installed in the duct.

22. An underfloor cable junction unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the unit having slide-in connector units being arranged on at least two levels in the junction unit, one above the other and being spaced vertically from each other to provide passage of cooling air in the duct through the junction unit between the opposite faces, opposite faces on different horizontally spaced members and comprising rows of connectors arranged on at least two levels, one above the other, both of the faces including open slits between the rows of connectors to provide passage of cooling air in the duct through the junction between both of the faces, the open slits thereby forming part of the cooling air supply duct while the cable junction unit is installed in the duct, the junction unit having lateral sides, wherein the lateral sides or at least a major part of them are open and thereby form part of the cooling air supply duct while the cable junction unit is installed in the duct.

23. An underfloor cable junction unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction at at least one of its faces, the slide-in connector units being arranged on at least two levels in the junction unit, one above the other and being spaced vertically from each other to provide passage of cooling air in the duct through the junction unit between the opposite faces, the slide-in connector units having rows of connectors, the connectors including enclosures.

24. An underfloor cable junction unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the slide-in connector units being arranged on at least two levels in the junction unit, one above the other and being spaced vertically from each other to provide passage of cooling air in the duct through the junction unit between the opposite faces, the junction unit having a frame structure with a frame, the frame comprising portal front parts and sidebars connecting the front parts, such that the portal front parts are opposite each other.

25. The underfloor cable junction unit of claim 24, wherein both front parts are open at least at their lower parts to enable bunches of permanent data cables to pass through the junction unit, whereby the permanent cable bunches are encompassed and thereby guided.

26. The underfloor cable junction unit of claim 24, wherein several mounting positions are provided for the sidebars to enable them to be mounted at different heights.

27. The underfloor cable junction unit of claim 24, wherein the sidebars are mounted to the front parts in a dismountable manner to enable them to be replaced or their mounting height to be changed.

28. The unit of claim 24, in combination with the raised-floor system, wherein the unit is below the raised floor of the raised-floor system, and is on a structure on a base floor beneath the raised floor.

29. An underfloor cable junction unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the slide-in connector units being arranged on at least two levels in the junction unit, one above the other and being spaced vertically from each other to provide passage of cooling air in the duct through the junction unit between the opposite faces, the junction unit having a frame structure with a frame, the frame comprising portal front parts and sidebars connecting the front parts, such that the portal front parts are opposite each other, the underfloor cable junction unit being arranged to be height adjustable.

30. An underfloor cable junction unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the slide-in connector units being arranged on at least two levels in the junction unit, one above the other and being spaced vertically from each other to provide passage of cooling air in the duct through the junction unit between the opposite faces, the junction unit having a frame structure with a frame, the frame comprising portal front parts and sidebars connecting the front parts, such that the portal front parts are opposite each other, the underfloor cable junction unit being arranged to be width adjustable.

31. An underfloor cable junction unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the slide-in connector units being arranged on at least two levels in the junction unit, one above the other and being spaced vertically from each other to provide passage of cooling air in the duct through the junction unit between the opposite faces, the junction unit having faces and lateral sides, at least one of the faces including rows of data connectors, and at least one horizontal sidebar is arranged at each of the lateral sides, the at least one horizontal sidebar being arranged to enable permanent cables coming from the inner side of said connector rows to pass above and outwardly of the sidebar downwardly to a base floor and to be fixed to the sidebar.

32. The underfloor cable junction unit of claim 31, further comprising patch cable guiding elements arranged laterally at at least one of the faces of the junction unit, said guiding elements enabling patch data cables plugged into data connectors of the connector rows to be guided laterally on the face of the junction unit downwardly to a base floor.

33. The underfloor cable junction unit of claim 31, wherein both faces are open at least at their lower parts to enable bunches of permanent data cables to pass through the junction unit, whereby the permanent cable bunches are encompassed and thereby guided.

34. An underfloor cable junction unit for installation in a raised-floor system above a base floor, the space between the base floor and the raised floor being arranged as a cooling air supply duct, the junction unit having dimensions enabling the unit to be located between the base and raised floors, the unit having opposite faces on different horizontally spaced members and comprising slide-in data connector units able to be slid from outside into the junction unit at at least one of its faces, the slide-in connector units being arranged on at least two levels in the junction unit, one above the other and being spaced vertically from each other to provide passage of cooling air in the duct through the junction unit between the opposite faces, the raised floor having panels with cooling air outlets, the unit comprising first and second horizontally extending, elongated, spaced members extending generally parallel to each other, sidebars extending between first and second parallel planes in which the first and second members are located and affecting the spacing between the parallel planes, structures mechanically connecting the members and sidebars together so the (a) connecting structures, (b) elongated members and (c) and sidebars form a frame having a substantially open top between the spaced elongated members and sides with openings for enabling cooling air between the base floor and the raised floor to flow from outside the frame and through the top toward a panel in the raised floor with cooling air outlets, the first and second members having faces facing away from an interior portion of the frame, the faces of the first and second members including many data connectors for electromagnetic signals, the many data connectors included on the faces of the first and second members being at many different positions in the elongation direction of the first and second members.

35. The underfloor cable junction unit of claim 34 further including third and fourth horizontally extending elongated members respectively located in the first and second planes, the first and third members being vertically spaced from each other, the second and fourth members being vertically spaced from each other, the spacings between the first and third members and the second and fourth members forming openings for enabling cooling air to flow from outside the frame and through the top toward the panel, the third and fourth members having faces facing away from the interior portion of the frame, the faces of the third and fourth members including many data connectors for electromagnetic signals, the many data connectors included on the faces of the third and fourth members being at many different positions in the elongation direction of the third and fourth members.

36. The underfloor cable junction unit of claim 35 wherein the first and third members carry a plurality of the slide in electrical connector units that engage a face of the members facing toward the interior portion of the frame, the slide in units being arraigned so there is a gap between the slide in members on the first and third members, the gap being such that cooling air in the space between the base and raised floors can flow through the gap from outside the frame and through the top toward the panel.

37. The underfloor cable junction unit of claim 34 wherein the connecting structures include vertically extending posts to which the members and sidebars are mechanically connected.

38. The underfloor cable junction unit of claim 37 wherein the posts include feet for supporting the posts and the underfloor cable junction unit on the base floor, the spacing of the posts in the elongation direction of the members and the heights of the members above the base floor being sufficient to enable cables that extend in the same direction as the sidebars to pass between the posts.

39. The underfloor cable junction unit of claim 37 wherein the posts are connected together by struts for supporting the posts and the underfloor cable junction on the base floor, the spacing of the posts in the elongation direction of the members and the heights of the members above the base floor being sufficient to enable cables that extend in the same direction as the sidebars to pass between the posts and above the struts.

\* \* \* \* \*